US012084981B2

(12) United States Patent
Simard-Bergeron (10) Patent No.: US 12,084,981 B2
(45) Date of Patent: Sep. 10, 2024

(54) JOURNAL BEARING WITH OIL POCKET

(71) Applicant: PRATT & WHITNEY CANADA CORP., Longueuil (CA)

(72) Inventor: Julien Simard-Bergeron, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/656,975

(22) Filed: Mar. 29, 2022

(65) Prior Publication Data

US 2023/0313706 A1    Oct. 5, 2023

(51) Int. Cl.

| F01D 25/16 | (2006.01) |
|---|---|
| F01D 25/18 | (2006.01) |
| F02B 39/14 | (2006.01) |
| F02C 6/12 | (2006.01) |
| F04D 29/046 | (2006.01) |
| F16C 17/02 | (2006.01) |
| F16C 17/18 | (2006.01) |
| F16C 17/24 | (2006.01) |

(52) U.S. Cl.
CPC ........... *F01D 25/162* (2013.01); *F01D 25/18* (2013.01); *F02B 39/14* (2013.01); *F02C 6/12* (2013.01); *F04D 29/046* (2013.01); *F16C 17/02* (2013.01); *F16C 17/18* (2013.01); *F16C 17/24* (2013.01); *F05D 2220/40* (2013.01); *F05D 2240/50* (2013.01); *F05D 2260/98* (2013.01); *F16C 2360/24* (2013.01)

(58) Field of Classification Search
CPC ........ F01D 25/162; F01D 25/18; F16C 17/02; F16C 17/18; F16C 17/24; F16C 2360/24; F16C 1/24; F02B 39/14; F02C 6/12; F04D 29/046; F05D 2220/40; F05D 2260/98; F05D 2240/50
USPC ........................... 415/122.1; 284/397; 464/7
See application file for complete search history.

(56) References Cited

U.S. PATENT DOCUMENTS

| 4,553,857 A | 11/1985 | Ney |
|---|---|---|
| 6,056,509 A | 5/2000 | Nakayama et al. |

(Continued)

OTHER PUBLICATIONS

European Search Report issued on Aug. 3, 2023 for correponding application No. 23164836.1.

*Primary Examiner* — Kenneth J Hansen
*Assistant Examiner* — Kelsey L Stanek
(74) *Attorney, Agent, or Firm* — NORTON ROSE FULBRIGHT CANADA LLP (57) ABSTRACT

A journal shaft for a journal bearing assembly of an aircraft engine includes a shaft body extending along a longitudinal axis. The shaft body has a radially outer surface and a radially inner surface radially spaced apart from the longitudinal axis to define an inner cavity. An oil pocket is defined in the radially outer surface. One or more passages extend through the shaft body from the radially inner surface to the oil pocket to provide fluid communication between the inner cavity and the oil pocket. The oil pocket includes a radially inner base surface and interconnecting transition surfaces extending between the radially inner base surface of the oil pocket and the radially outer surface of the shaft body. The interconnecting transition surfaces form a fluid-dynamically smooth and edgeless transition to the radially outer surface of the journal shaft.

18 Claims, 7 Drawing Sheets

(56) References Cited

U.S. PATENT DOCUMENTS

| | | |
|---|---|---|
| 8,690,721 B2 | 4/2014 | McCune |
| 8,894,529 B2 * | 11/2014 | McCune ................ F02C 7/32 |
| | | 475/159 |
| 9,109,628 B2 | 8/2015 | Sieveking et al. |
| 10,851,671 B2 | 12/2020 | Simard-Bergeron et al. |
| 10,935,076 B2 | 3/2021 | Martin et al. |
| 2020/0347882 A1 * | 11/2020 | Martin ................ F16H 57/043 |
| 2023/0054545 A1 | 2/2023 | Martin |
| 2023/0054748 A1 | 2/2023 | Martin et al. |
| 2023/0061176 A1 | 3/2023 | Stephan et al. |

\* cited by examiner

JOURNAL BEARING WITH OIL POCKET

TECHNICAL FIELD

The present disclosure relates generally to bearings for rotating shafts and/or assemblies in aircraft engines and, more particularly, to journal bearings for such aircraft engines.

BACKGROUND

Aircraft engines typically include a number of rotating components or parts mounted together via mounting devices, such as bearings, providing suitable support and allowing rotational movement between the components. Roller bearings and/or journal bearings are often used for rotating shafts in such engines, including in their gearboxes. Journal bearings employ a journal shaft rotating in a sleeve. To lubricate journal bearings, a fluid such as oil is used to create a film between the journal shaft and the gear sleeve. While suitable for their intended purposes, improvements of such journal bearings is sought.

SUMMARY

In one aspect, there is provided a journal shaft for a journal bearing assembly of an aircraft engine, comprising: a shaft body extending along a longitudinal axis, the shaft body having a radially outer surface and a radially inner surface radially spaced apart from the longitudinal axis to define an inner cavity; and an oil pocket defined in the radially outer surface, one or more passages extending through the shaft body from the radially inner surface to the oil pocket to provide fluid communication between the inner cavity and the oil pocket, the oil pocket including a radially inner base surface and interconnecting transition surfaces extending between the radially inner base surface of the oil pocket and the radially outer surface of the shaft body, wherein the interconnecting transition surfaces form a fluid-dynamically smooth and edgeless transition to the radially outer surface of the journal shaft.

In another aspect, there is provided a journal bearing assembly for an aircraft engine, comprising: a bearing sleeve defining a bore; and a journal shaft rotatable within the bore of the bearing sleeve, the journal shaft having a shaft body extending along a longitudinal axis, the shaft body having a radially outer surface and a radially inner surface radially spaced apart from the longitudinal axis to define an inner cavity, and an oil pocket defined in the radially outer surface, one or more passages extending through the shaft body from the radially inner surface to the oil pocket to provide fluid communication between the inner cavity and the oil pocket, the oil pocket including a radially inner base surface and interconnecting transition surfaces extending between the radially inner base surface of the oil pocket and the radially outer surface of the shaft body, wherein the interconnecting transition surfaces form a fluid-dynamically smooth and edgeless transition to the radially outer surface of the journal shaft.

BRIEF DESCRIPTION OF THE DRAWINGS

Reference is now made to the accompanying figures in which:

FIG. 6 is a longitudinally sectioned perspective view of a journal bearing assembly as disclosed herein, mounted without a pin.

DETAILED DESCRIPTION

Figure 1:
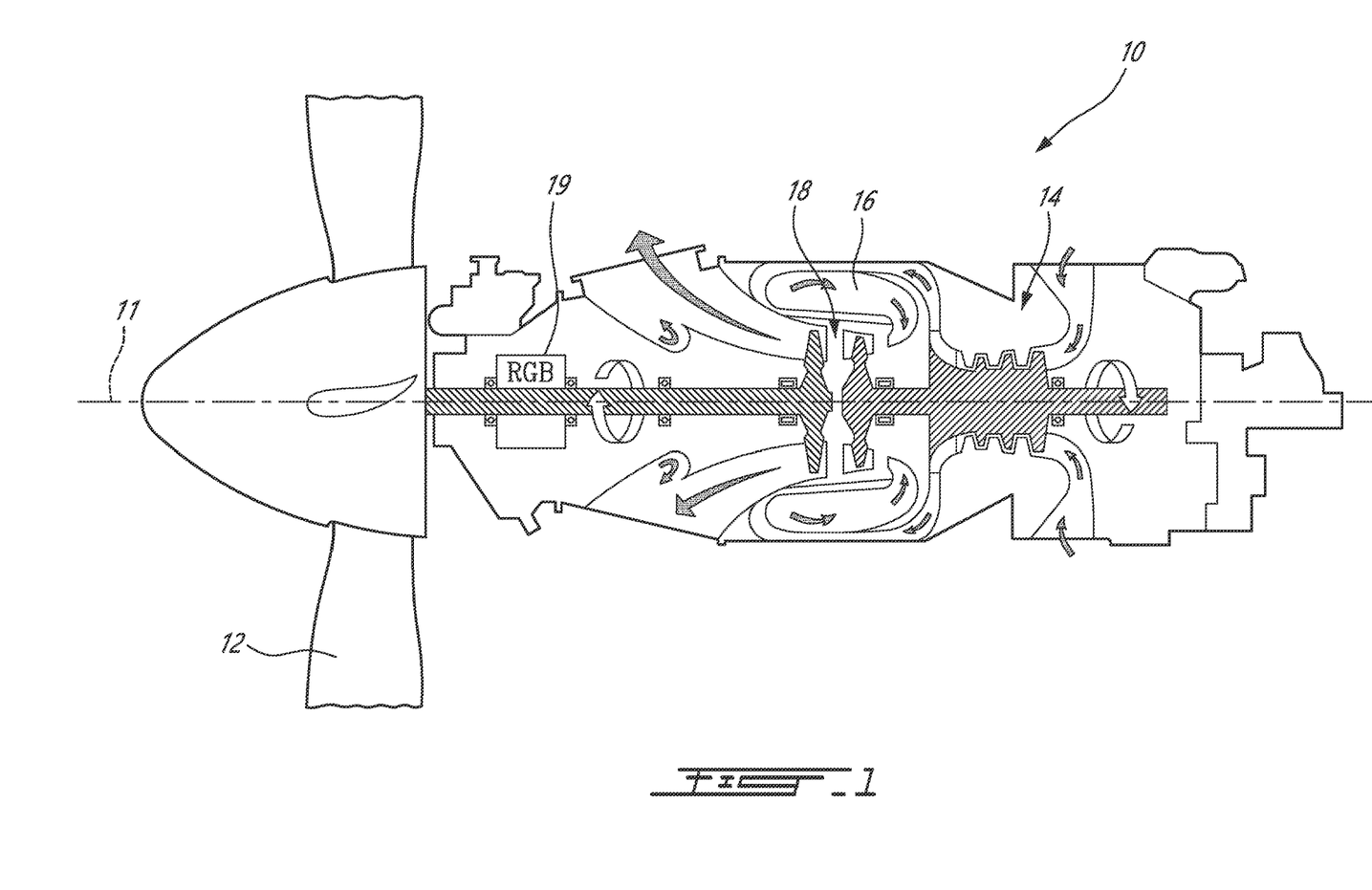
FIG. 1 is a schematic cross sectional view of a gas turbine engine.

FIG. 1 illustrates a gas turbine engine 10 of a type preferably provided for use in subsonic flight and configured for driving a load 12, such as, but not limited to, a propeller or a helicopter rotor or rotorcraft rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the present description specifically refer to a turboprop engine as an example, it is understood that aspects of the present disclosure may be equally applicable to other types of combustion engines in general, and other types of aircraft engines in particular, including but not limited to turboshaft or turbofan engines, hybrid-electric engines, auxiliary power units (APU), and the like.

Figure 2:
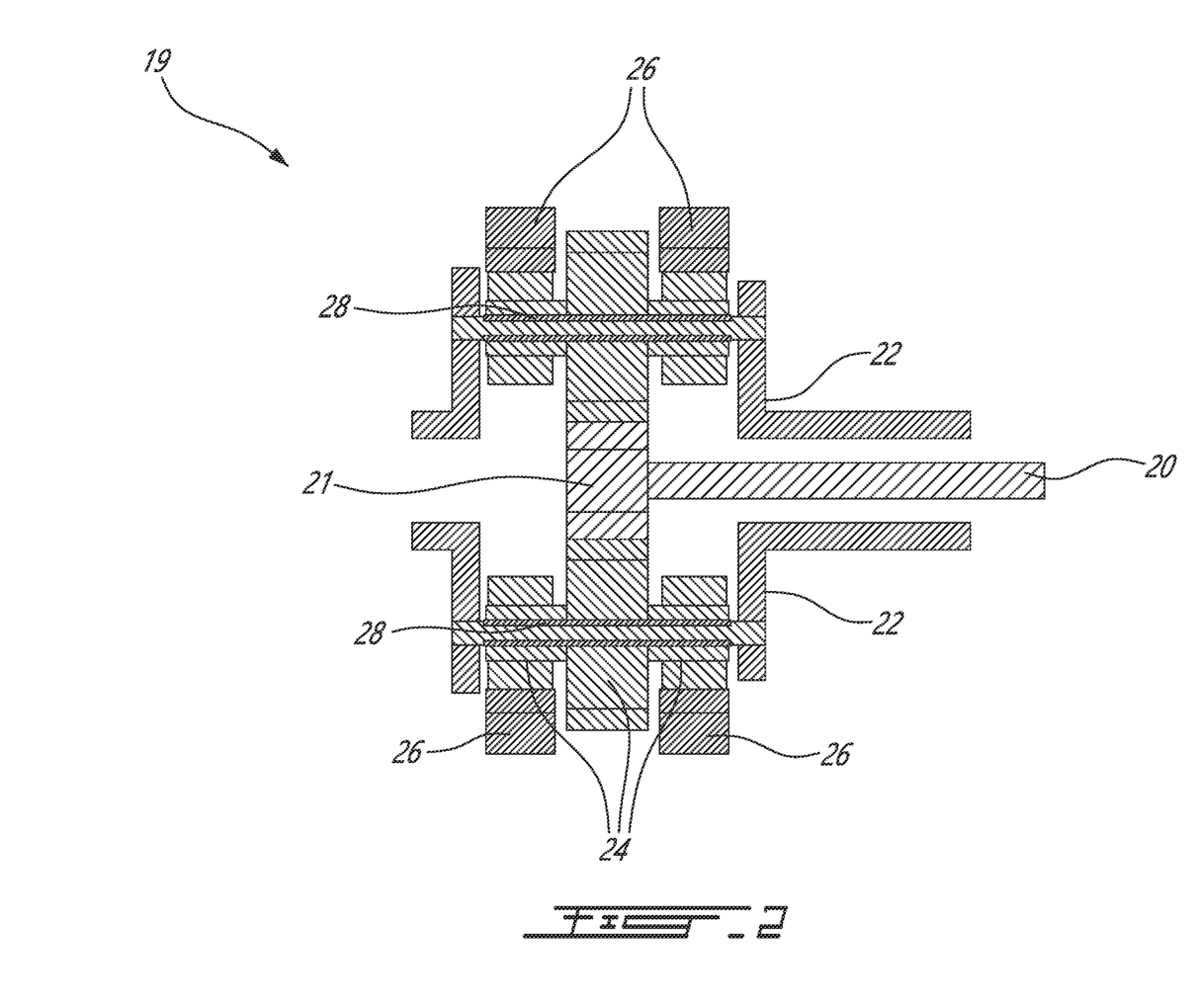
FIG. 2 is schematic cutaway perspective view of a gear assembly used in a gearbox of the gas turbine engine of FIG. 1.

The engine 10 also includes rotating parts or assemblies, such as gear assemblies 19 (e.g., epicycle reduction systems, planetary/reduction gearboxes (RGB), or other types of rotating assemblies) with rotating components mounted thereto using mounting devices allowing rotational and/or axial movement. In the embodiment shown, the gear assembly 19 is mounted at the front end of the engine 10, though it may be at other locations in the engine 10. An example of a gear assembly 19 as used in the engine 10 is shown in FIG. 2. In the depicted embodiment, the gear assembly 19 is part of a reduction gearbox (RGB) of the engine 10. In one possible embodiment, the RGB may include, for example, an epicycle reduction system, also known as epicyclic gear train, epicyclic gearbox, planetary gearbox, etc. As a contemplated embodiment among others, an input torque through a sun shaft 20 is rotatably outputted through a sun gear 21 as an output torque through gear carriers 22 via a plurality of planet gears 24 rotatably connected to the gear carriers 22 and ring gears 26.

Figure 3:
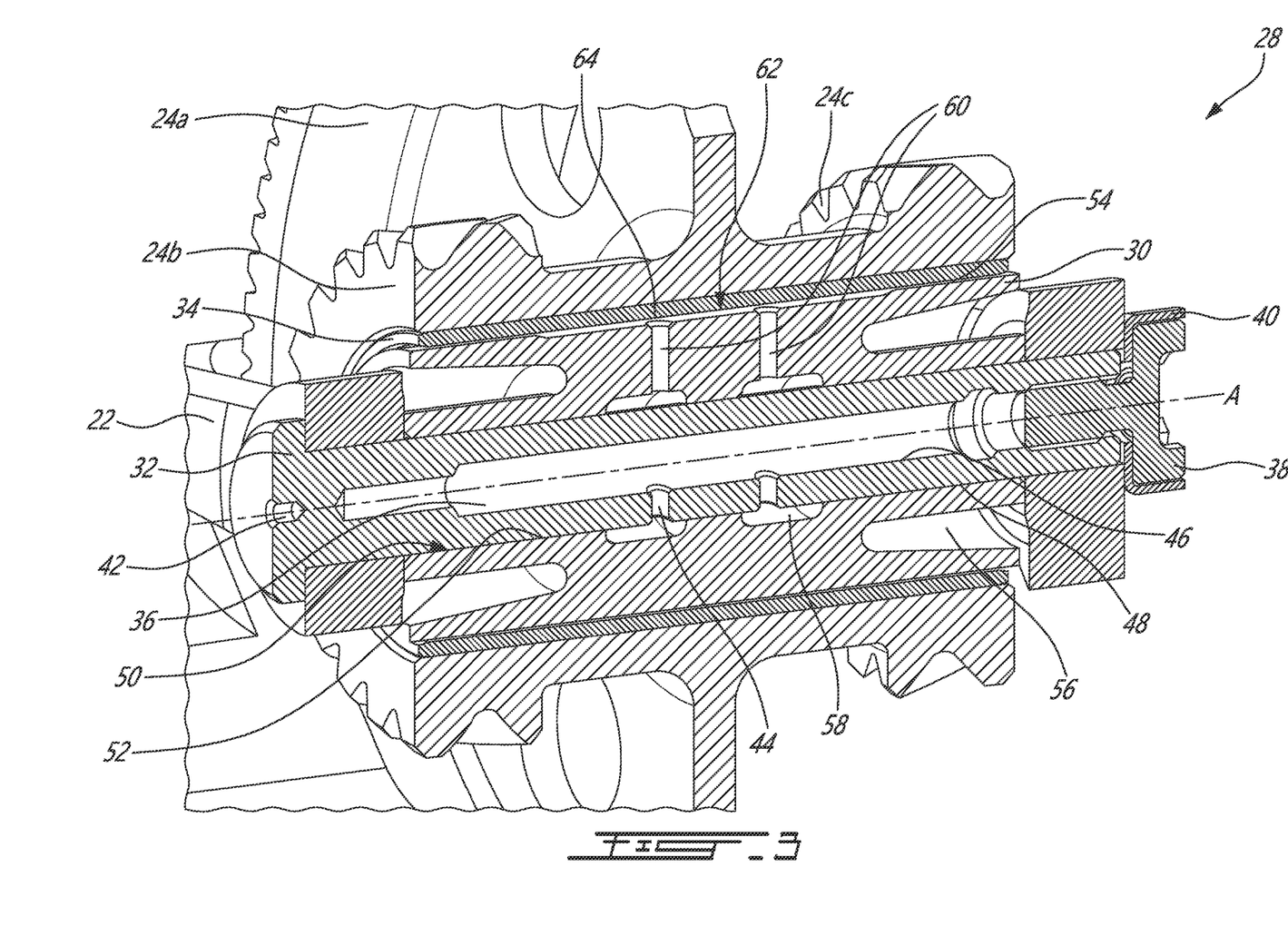
FIG. 3 is longitudinally sectioned perspective view of a journal bearing assembly in accordance with the present disclosure.

The gear assembly 19 shown in FIG. 2 includes one or more mounting devices such as a journal bearing assembly 28. As shown in FIG. 3, the journal bearing assembly 28 includes a journal shaft 30 (also referred to as a journal or a shaft), an optional pin 32 (see FIG. 6 for an example of a pin-less journal bearing assembly), and, in this particular embodiment, a bearing sleeve 34. In certain alternate embodiments, the bearing sleeve 34 may integrated directly into a surrounding component, such that the journal shaft 30 rotates within another bore, for example defined within the gear carrier or other suitable housing. The journal shaft 30 is thus rotatably mounted within a bore defined by a surrounding component, which component can be, for example, the sleeve 34, a gear, a carrier, another suitable shaft housing, etc. The journal bearing assembly 28 may be used for interfacing a rotating part to a structure. In the example shown, the rotating part is one or more gears such as planet gears 24 configured to rotate at speeds between 4,000 and 15,000 revolutions per minute (RPM), although other rotational speeds and arrangements are possible. The gear may be an epicycle gear of epicyclic reduction system, mounted on the journal bearing assembly 28 which is supported at both ends between two axially spaced supports forming at least part of the structure of the epicyclic gear system, the structure being for instance a carrier 22. In an embodiment, there are a plurality of planet gears 24 (illustratively three planets 24a, 24b 24c) on the carrier 22, the planet gears 24 being interconnected for concurrent rotation. The supports may be annular blocks (not shown) supporting the pin 32 at its opposed ends. The illustrated pin 32 is hollow with a pin inner cavity 36 and may be optionally closed at one end via a fastener such as a bolt 38 and a washer 40. A lubricating fluid film, such as an oil film, may be received between rotating components of the journal bearing assembly 28 to facilitate rotation of said components relative to one another, as will be discussed in further detail below. The pin inner cavity 36 may thus include an inlet 42 and at least one outlet passage 44 for oil to flow through. Such pin outlet passages 44 are illustratively radially-extending pin outlet passages 44 (also referred to as "pin radial passages") that extend from a radially inner pin surface 46 that defines the pin inner cavity to a radially outer pin surface 48. While the illustrated pin 32 includes two such pin outlet passages 44, other numbers of outlet passages may be contemplated.

The journal bearing assembly 28 may or may not include the sleeve 34 disposed radially outwardly to the journal shaft 30 relative to a longitudinal axis A of the journal bearing assembly 28. Such sleeve 34 may be used to form an outer peripheral surface of the journal bearing assembly 28, upon which the planet gears 24 are mounted in the illustrated embodiment. Otherwise, an outer surface of the journal shaft 30 may contact directly the rotating part it supports, e.g., the planet gears 24 in the illustrated embodiment, as will be discussed in further detail below.

Figure 4:
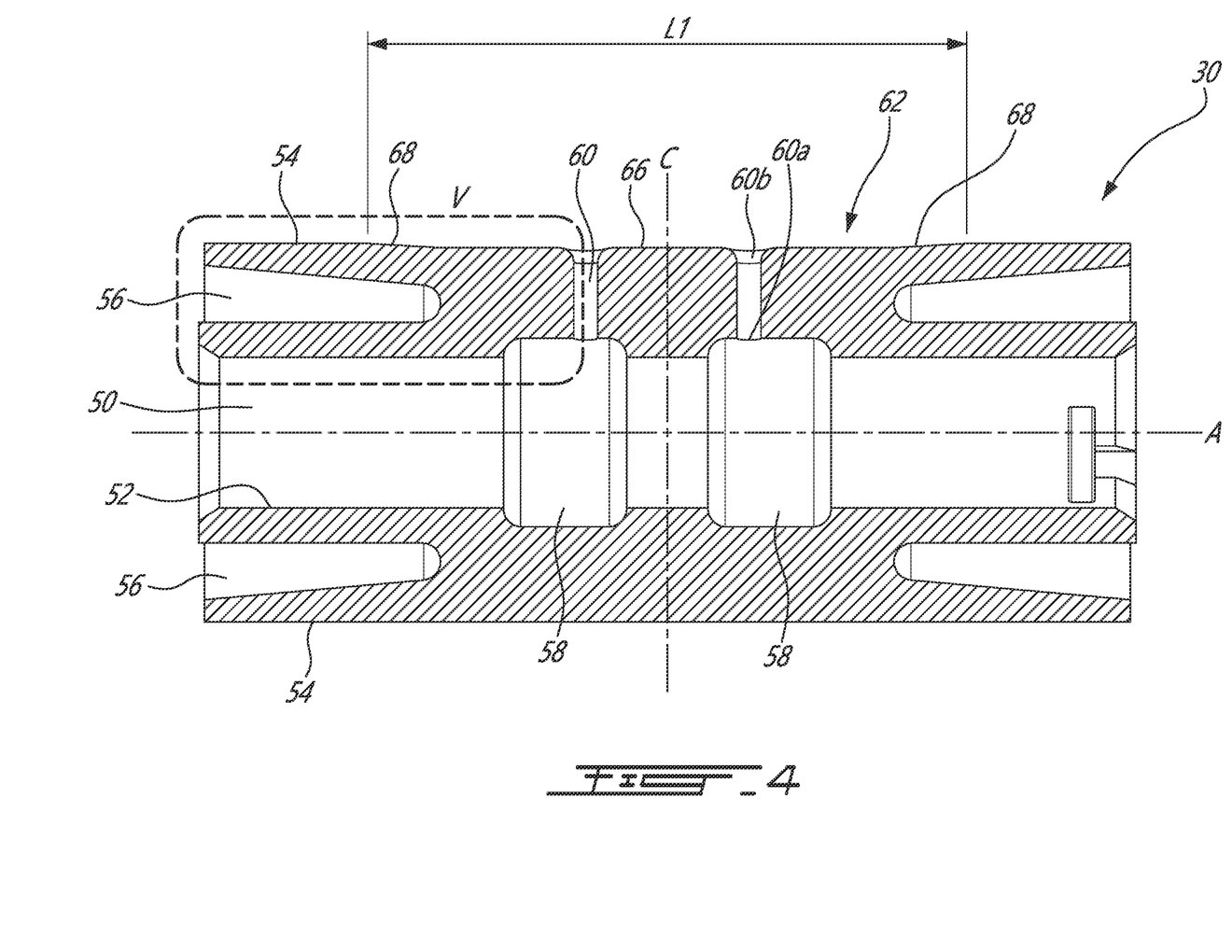
FIG. 4 is a cross-sectional view of a journal shaft of the journal bearing assembly of FIG. 3.

Referring to FIGS. 3 and 4, an embodiment of a journal bearing assembly 28 is shown. The journal shaft 30 may be a monolithic piece. While journal shaft 30 is shown to be cylindrical, other shapes are possible such as frusto-conical, and the journal shaft 30 may have various surface features such as grooves, slots and channels, as will be discussed in further detail below. The journal shaft 30 includes a shaft body extending along the longitudinal axis A, which is the rotation axis of the rotating part, illustratively the three planet gears 24a, 24b, 24c. An inner cavity 50 or pin-receiving cavity 50 (a.k.a., through hole) extends along the longitudinal axis A and defines a radially inner surface 52 of the journal shaft 30, also referred to as a pin-engaging surface 52 that engages the radially-outer pin surface 48. Stated differently, the radially inner surface 52 of the journal shaft 30 is radially spaced apart from the longitudinal axis A to define the inner cavity 50. The journal shaft 30 has a radially outer surface 54 that is configured for interfacing and supporting the rotating part, either directly (in a sleeveless embodiment) or via the optional sleeve 34. The pin-receiving cavity 50 may thus receive the pin 32 of the gear assembly 19 when mounted within such assembly 19. The shaft 30 may include various compliance features 56 at the distal ends of the journal shaft 30, which may also be referred to as undercuts or axial depressions.

Depending on the configuration, the journal bearing assembly 28 may have its journal shaft 30 fixed to the pin 32, such that the sleeve 34 (if present) or the rotating part (in a sleeveless embodiment) rotates about the pin 32 and the journal shaft 30. If present, the sleeve 34 concurrently rotates with the rotating part fixed thereon. In another embodiment, the journal bearing assembly 28 may have its journal shaft 30 rotatably engaged with the rotating part it supports, such that the journal shaft 30 may be rotatable relative to the pin 32 and may have the rotating part mounted thereto rotatable relative to the journal shaft 30, for instance with the sleeve 34 fixed to the rotating part or to the journal shaft 30.

As discussed above, a lubricating fluid such as oil may be provided through the pin inlet 42. The oil may flow through the pin inner cavity 36 towards the radially-extending pin outlet passages 44. Each pin outlet passage 44 extends from the radially inner pin surface 46 to the radially outer pin surface 48 which interfaces with the radially inner surface 52 of the journal shaft 30. In the depicted case, the radially inner surface 52 includes at least one circumferential oil chamber 58 (illustratively two circumferential oil chambers 58) extending about the radially inner surface 52 and aligned with the pin outlet passages 44. As such, the oil exiting from the pin outlet passages 44 may collect in respective circumferential oil chambers 58. At least one oil passage 60 (illustratively two oil passages 60) extend radially through the journal shaft 30 with inlet sections 60a in fluid communication with respective circumferential oil chambers 58 and outlet sections 60b in fluid communication with an oil pocket 62 on the radially outer surface 54 of the journal shaft 30. In the shown case, oil passages 60 extend through the journal shaft 30 in a direction normal to the longitudinal axis A, although other directions may be contemplated. While two circumferential oil chambers 58 and two oil passages 60 are shown, the number of may vary and may be selected to match the number of pin outlet passages 44.

The various passages 44, 60 and circumferential oil chambers 58 may be sized and shaped to control the flow of oil to the radially outer surface 54 of the journal shaft. The oil pocket 62 may hold oil (or another lubrication fluid) to be distributed between the radially-outer surface 54 of the journal shaft 30 and a radially-inner surface 64 of the sleeve 34. In an exemplary embodiment, oil may enter the pin inner cavity 36 through oil inlet 42, pass through outlet passages 44 to circumferential oil chambers 58, then pass through oil passages 60 through journal shaft 30 to the oil pocket 62. The oil passages 60 may be configured for feeding oil to the oil pocket 62 at a pressure of about 100 PSI, although other pressures may be contemplated. The oil may then create a lubricating film between the radially-outer surface 54 of the journal shaft 30 and the radially-inner surface 64 of the sleeve 34 (or between the radially-outer surface 54 of the journal shaft 30 and the one or more gears 24 being supported in a sleeveless configuration).

Figure 5A:
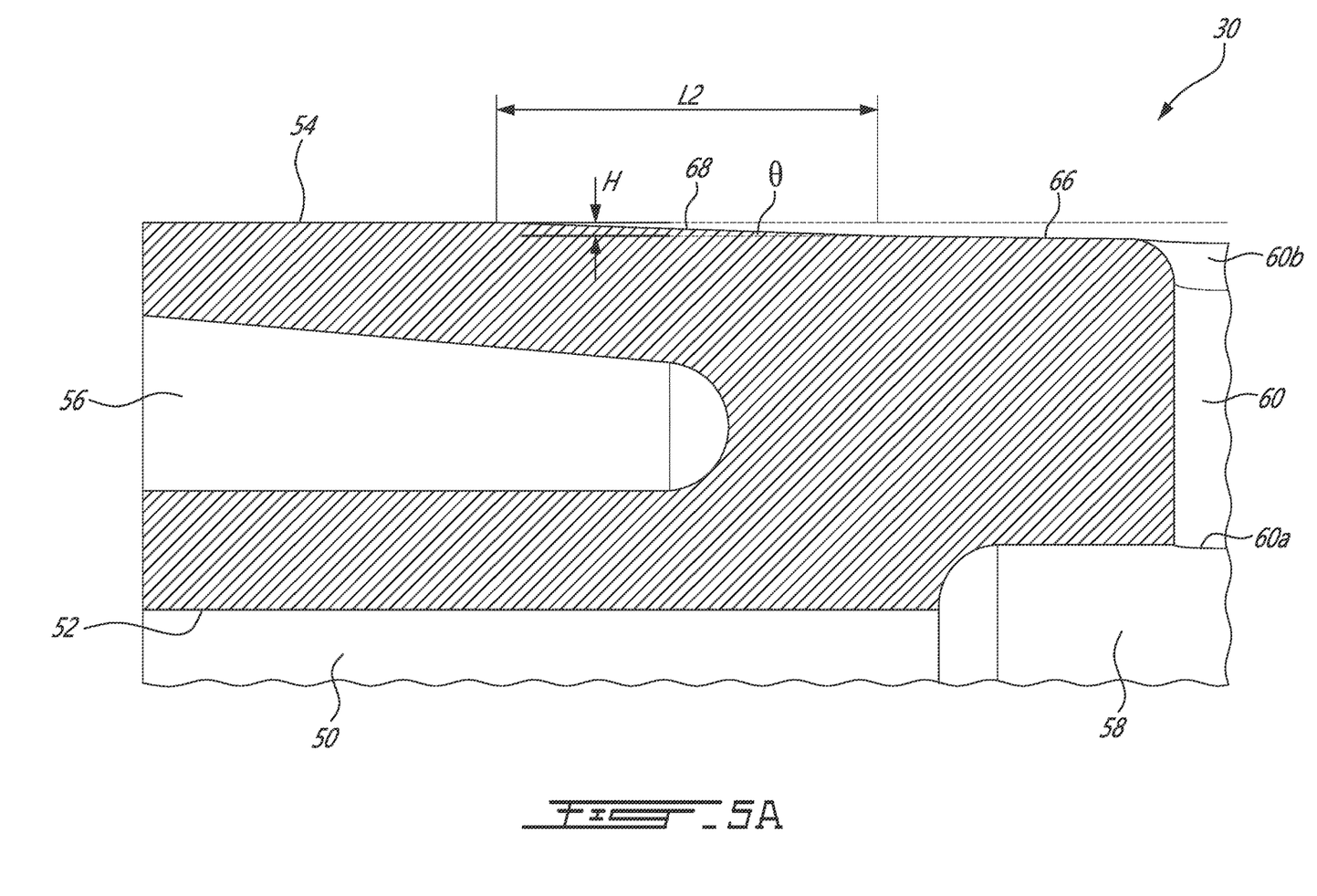
FIGS. 5A-5B are enlarged cross-sectional views of the journal shaft of FIG. 4.
Figure 5B:
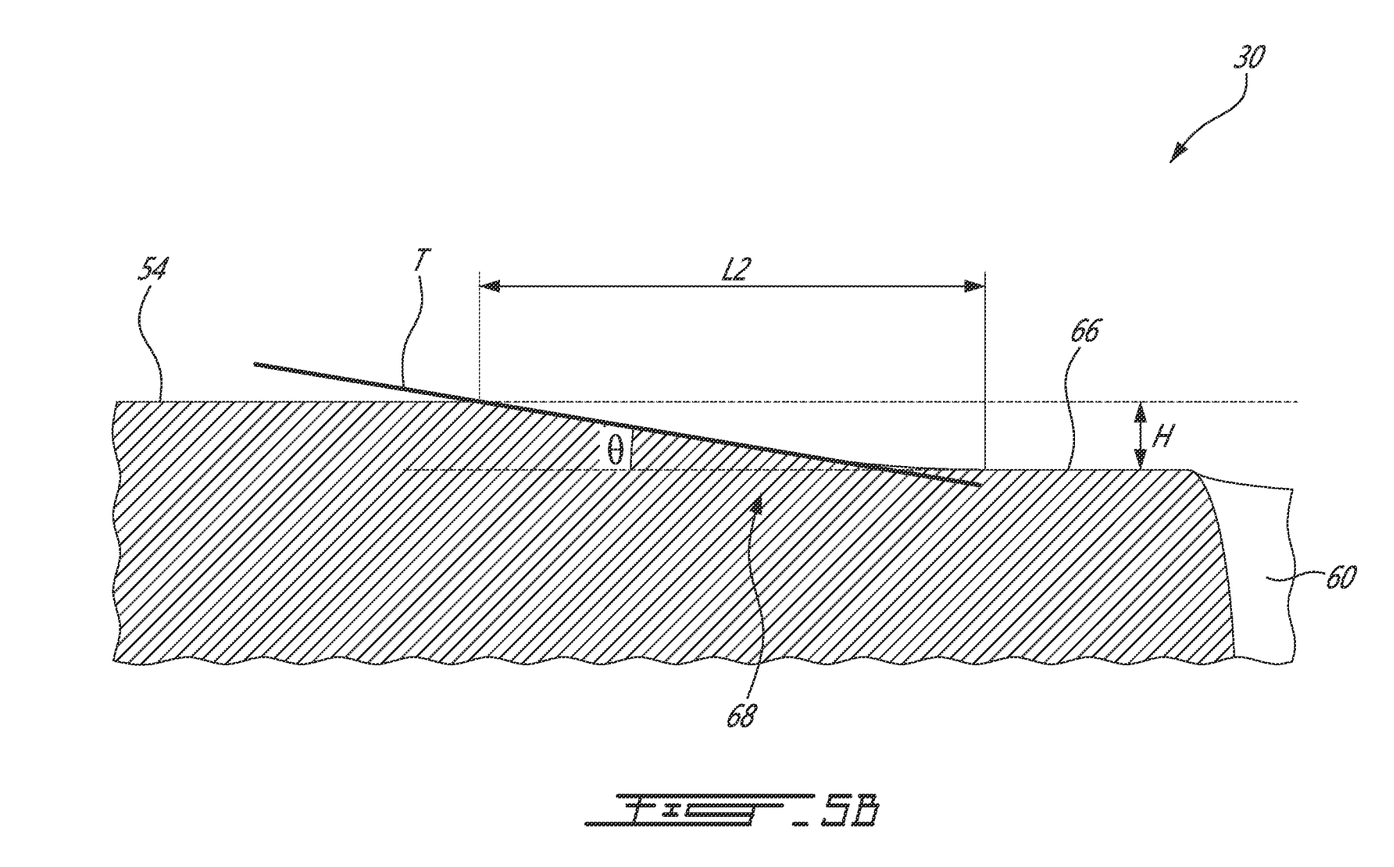
Figure 8:
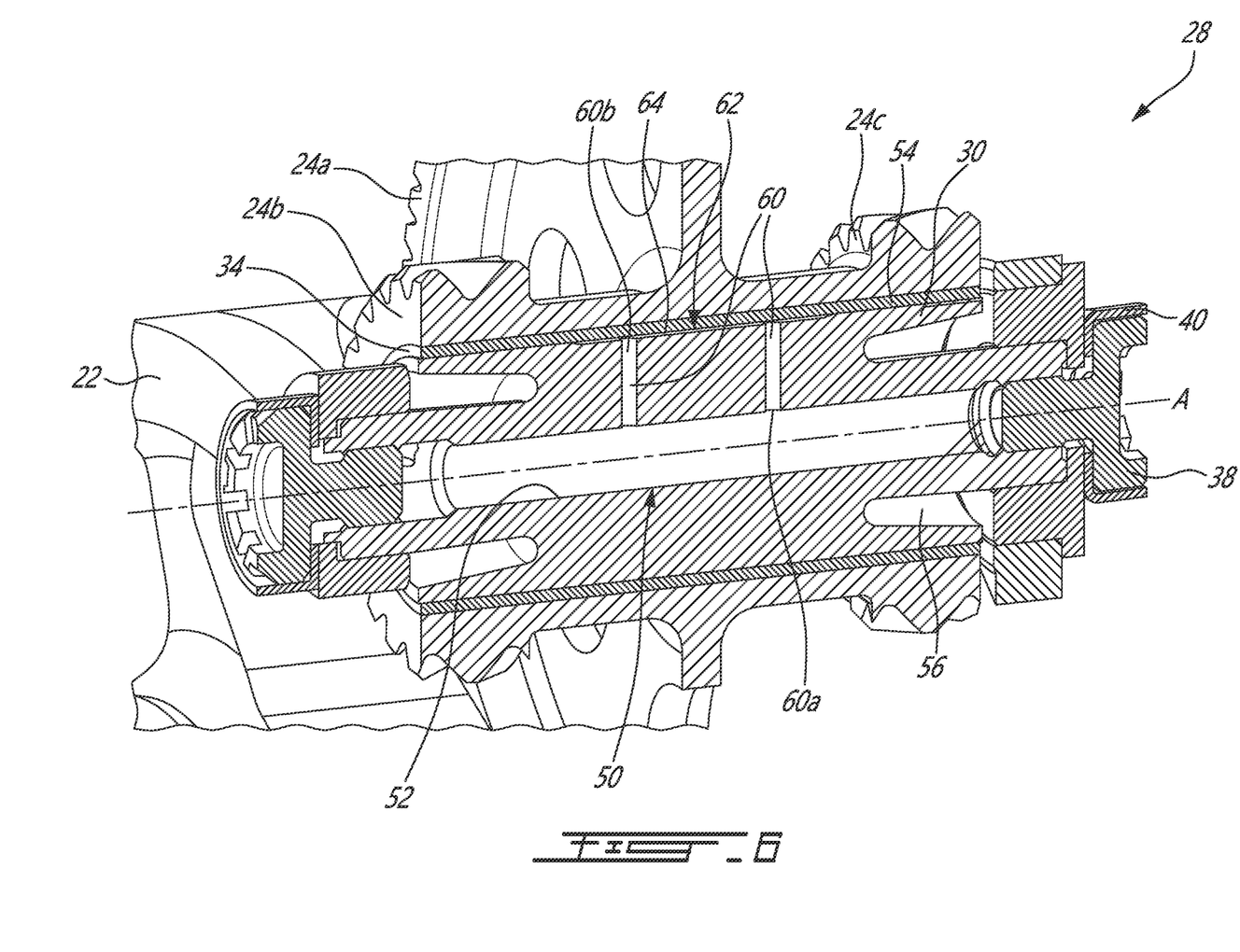

Referring to FIGS. 4-5B, the oil pocket 62 includes a radially inner base surface 66, also referred to as a recessed base surface, that is illustratively concentric with the radially outer surface 54 of the journal shaft 30. Other non-concentric base configurations may be contemplated. The oil pocket 62 further includes interconnecting transition surfaces 68, illustratively a pair of interconnecting transition surfaces 68, extending between the radially inner base surface 66 of the oil pocket 62 and the radially outer surface 64 of the journal shaft 30. The pair of interconnecting transition surfaces 68 provide a fluid-dynamically smooth and edgeless transition between the radially inner base surface 66 and the radially outer surface 54 of the journal shaft 30. The expression "fluid-dynamically smooth and edgeless transition" as used herein is understood to mean that the junction between the interconnecting transition surfaces 68 and the radially outer surface 54 does not include sharp or pointed edges. This smooth or seamless design provides a gradual decrease in the pressure gradient between the oil pocket 62 and the radially outer surface 54 of the journal shaft 30, which may decrease the journal bearing assembly's propensity towards oil-related cavitation damage. The interconnecting transition surfaces 68 between the oil pocket 62 and the radially outer surface 54 of the journal shaft 30 may thus be said to be fluid-dynamically smooth.

In previous journal bearing designs, cavitation may occur under operation of the engine at the radially outer surface of the journal shaft in an area localized at the junction between the oil pocket and the radially outer surface. The sharp or pointed edges of these junction points, which may be referred to as fluid-dynamically unsmooth transition surfaces, may cause a notable pressure gradient between the oil pocket and the radially outer surface, which may contribute to a propensity towards cavitation in these previous journal bearing designs.

Referring to FIGS. 4-5B, the shape of the interconnecting transition surfaces 68 may vary to provide the smooth and edgeless transition to the radially outer surface 54. For instance, the axial profile of each interconnecting transition surface 68 along the axis A may follow a curve based on a linear function, a polynomial function, a sinusoidal function, or a double radius curve. Other curve types may be contemplated as well. To achieve the fluid-dynamically smooth and edgeless transition between the radially inner base surface 66 and the radially outer surface 54 of the journal shaft 30, each interconnecting transition surface 68 may be tangent to the radially outer surface 54 (or nearly tangent) at their junction.

In the embodiment shown in FIGS. 4-5B, the oil pocket 62 may be referred to as an axially-extending oil pocket 62 and may be geometrically defined by an overall axial length L1 of the oil pocket 62, an axial length L2 of each interconnecting transition surface, and a radial depth H between the radially outer surface 54 of the journal shaft 30 and the radially inner base surface 66 of the oil pocket 62. Other oil pocket geometries, such as tangentially-extending oil pockets, may be contemplated as well. In the shown case, oil pocket 62, including the pair of interconnecting transition surfaces 68, is symmetric about a longitudinal center C of the journal shaft 30. As such, radial depth H is consistent along the axial length of the radially inner base surface 66, and the axial length L2 for each interconnecting transition surface 68 is alike. In other embodiments, the oil pocket's geometry may be asymmetric about the longitudinal center C (or about another reference point), and the two interconnecting transition surfaces 68 may be shaped differently, with different axial lengths L2.

The overall axial length L1 and radial depth H may be selected based on the lubrication requirements of the journal bearing assembly 28. For instance, to accommodate additional oil for the journal bearing assembly 28, one or both of the axial length L1 and the radial depth H of the oil pocket 62 may be increased. In addition, the axial length L1 may increase proportionally with an overall axial length of the journal bearing 30, as well as based on the number of oil passages 60. Respective values for L1 and H may also be selected along with axial length L2 to provide a smooth and edgeless transition between the radially inner base surface 66 and the radially outer surface 54 of the journal shaft 30. Other considerations may additionally affect the various dimensions of the oil pocket 62.

The values for axial length L2 may be selected based on the overall axial length L1 of the oil pocket 62 and the depth H to provide a smooth and edgeless transition between the radially inner base surface 66 and the radially outer surface 54 of the journal shaft 30. In an exemplary embodiment, the axial length L2 of each interconnecting transition surface 68 may occupy about ten to thirty percent of the overall axial length L1 of the oil pocket 62. Other percentages may be contemplated. The various dimensions of the oil pocket 62 may be selected to ensure a tangent line T of each interconnecting transition surface 68 does not exceed a maximum angle relative to longitudinal axis A. In some cases, the maximum angle $\theta$ is about 6 degrees. Preferably, the maximum angle is between about 1 to 4 degrees. Other maximum angles may be contemplated. In other cases, the maximum angle $\theta$ may represent an average slope of the tangent line T of each interconnecting transition surface 68 rather than a localized maximum angle. The axial length L2 of each interconnecting transition surface 68 may thus be selected based on, for instance, the overall axial length L1, the radial depth H, and the maximum tangent angle $\theta$. The function defining the shape of each interconnecting transition surface 68 may impact the selected dimensions as well.

Referring to FIG. 6, another embodiment of a journal bearing assembly 28 according to the present disclosure is shown, with like reference numerals referring to like features. In particular, the various characteristics, options and alternatives of the oil pocket 62 shown in FIGS. 4-5B and described above are also applicable to the oil pocket 62 of the journal bearing assembly shown in FIG. 6, and vice-versa.

The journal bearing assembly 28 may be referred to as a "pin-less" journal bearing assembly 28, as it does not include an insertable pin. Rather, the journal shaft 30 is structured to satisfy the functions of the pin 32 in the journal bearing assembly 28 shown in FIG. 3. In particular, lubricating oil is directed directly into the inner cavity 50 of the journal shaft 30. The inner cavity 50 may thus include an oil inlet (for instance towards one of the axial ends of the inner cavity 50) and an oil outlet (at least one, illustratively two, oil passages 60). The shown oil passages 60 extend radially through the journal shaft 30 with inlet sections 60a in fluid communication with the inner cavity 50 and outlet sections 60b in fluid communication with the oil pocket 62 on the radially outer surface 54 of the journal shaft 30. In addition, the inner cavity 50 may be closed at one or both axial ends by a fastener such as a bolt 38 and a washer 40.

It can be appreciated from the foregoing that at least some embodiments disclose a journal bearing assembly having a journal shaft with an oil pocket on a radially outer surface thereof having with smooth and edgeless transitional surfaces, thereby allowing the risk of cavitation damage to various components of the journal bearing to be minimized.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the angle of the tangent line of the interconnecting transition surfaces), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A journal shaft for a journal bearing assembly of an aircraft engine, comprising:
    a shaft body extending along a longitudinal axis, the shaft body having a radially outer surface and a radially inner surface radially spaced apart from the longitudinal axis to define an inner cavity; and
    an oil pocket defined in the radially outer surface, one or more passages extending through the shaft body from the radially inner surface to the oil pocket to provide fluid communication between the inner cavity and the oil pocket, the oil pocket including a radially inner base surface and interconnecting transition surfaces extending between the radially inner base surface of the oil pocket and the radially outer surface of the shaft body, wherein the interconnecting transition surfaces form a fluid-dynamically smooth and edgeless transition to the radially outer surface of the journal shaft;
    wherein each of the interconnecting transition surfaces defines a tangent line relative to the longitudinal axis with a maximum angle of about six degrees.

2. The journal shaft as defined in claim 1, wherein an axial length of each of the interconnecting transition surfaces occupies about ten to thirty percent of an overall axial length of the radially inner base surface.

3. The journal shaft as defined in claim 1, wherein the maximum angle of tangent line is about one to four degrees.

4. The journal shaft as defined in claim 1, wherein the oil pocket is axially symmetric about a longitudinal center of the shaft body.

5. The journal shaft as defined in claim 1, wherein an axial profile of each of the interconnecting transition surfaces is defined by a linear function.

6. The journal shaft as defined in claim 1, wherein an axial profile of each of the interconnecting transition surfaces is defined by a sinusoidal function.

7. The journal shaft as defined in claim 1, wherein an axial profile of each of the interconnecting transition surfaces is defined by a double radius curve.

8. The journal shaft as defined in claim 1, wherein the inner cavity defines a pin-receiving inner cavity, and the radially inner surface includes at least one circumferential oil chamber in fluid communication with the one or more passages.

9. The journal shaft as defined in claim 1, wherein the one or more passages extending through the shaft body extend through the shaft body in a direction normal to the longitudinal axis.

10. A journal bearing assembly for an aircraft engine, comprising:
    a bearing sleeve defining a bore; and
    a journal shaft rotatable within the bore of the bearing sleeve, the journal shaft having a shaft body extending along a longitudinal axis, the shaft body having a radially outer surface and a radially inner surface radially spaced apart from the longitudinal axis to define an inner cavity, and an oil pocket defined in the radially outer surface, one or more passages extending through the shaft body from the radially inner surface to the oil pocket to provide fluid communication between the inner cavity and the oil pocket, the oil pocket including a radially inner base surface and interconnecting transition surfaces extending between the radially inner base surface of the oil pocket and the radially outer surface of the shaft body, wherein the interconnecting transition surfaces form a fluid-dynamically smooth and edgeless transition to the radially outer surface of the journal shaft.

11. The journal bearing assembly as defined in claim 10, further comprising a pin disposed in the inner cavity of the journal shaft, the pin having a pin inner cavity in fluid communication with the inner cavity of the journal shaft via one or more pin radial passages.

12. The journal bearing assembly as defined in claim 11, wherein the inner cavity of the journal shaft includes one or more circumferential oil chambers in fluid communication with the one or more pin radial passages and the one or more passages extending through the shaft body.

13. The journal bearing assembly as defined in claim 10, wherein the oil pocket is axially symmetric about a longitudinal center of the shaft body.

14. The journal bearing assembly as defined in claim 10, wherein an axial profile of each of the interconnecting transition surfaces is defined by one of a linear function, a polynomial function, a sinusoidal function or a double radius curve.

15. The journal bearing assembly as defined in claim 10, wherein an axial length of each of the interconnecting transition surfaces occupies about ten to thirty percent of an overall axial length of the radially inner base surface.

16. The journal bearing assembly as defined in claim 10, wherein each of the interconnecting transition surfaces defines a tangent line relative to the longitudinal axis with a maximum angle of about six degrees.

17. The journal bearing assembly as defined in claim 16, wherein the maximum angle of the is about one to four degrees.

18. The journal bearing assembly as defined in claim 10, wherein the one or more passages extending through the shaft body extend through the shaft body in a direction normal to the longitudinal axis.

* * * * *